United States Patent
Anderson, Sr.

(10) Patent No.: US 7,190,676 B2
(45) Date of Patent: *Mar. 13, 2007

(54) TRAFFIC MANAGER, GATEWAY SIGNALING AND PROVISIONING SERVICE FOR ALL PACKETIZED NETWORKS WITH TOTAL SYSTEM-WIDE STANDARDS FOR BROADBAND APPLICATIONS INCLUDING ALL LEGACY SERVICES

(75) Inventor: Ronald D. Anderson, Sr., Madison, MS (US)

(73) Assignee: Cadtel Systems, Inc., Phoenix, AZ (US)

( * ) Notice: Subject to any disclaimer, the term of this patent is extended or adjusted under 35 U.S.C. 154(b) by 832 days.

This patent is subject to a terminal disclaimer.

(21) Appl. No.: 10/284,998

(22) Filed: Oct. 31, 2002

(65) Prior Publication Data
US 2003/0058796 A1 Mar. 27, 2003

Related U.S. Application Data

(63) Continuation of application No. 09/686,321, filed on Oct. 10, 2000, now Pat. No. 6,522,629.

(51) Int. Cl.
  H04J 3/06   (2006.01)
  H04L 12/24  (2006.01)
  H04L 12/26  (2006.01)
  H04L 12/66  (2006.01)
  H04Q 7/24   (2006.01)

(52) U.S. Cl. .............. 370/236; 370/338; 370/349; 370/350; 370/352; 370/389; 370/409; 370/410; 370/503; 370/522; 379/88.17; 379/93.07; 379/114

(58) Field of Classification Search ............... 370/236, 370/338, 349, 350, 352, 389, 409, 410, 503, 370/522; 379/88.17, 93.07, 114
See application file for complete search history.

(56) References Cited

U.S. PATENT DOCUMENTS

| | | | |
|---|---|---|---|
| 5,555,244 A | 9/1996 | Gupta et al. |
| 5,602,991 A | 2/1997 | Berteau |
| 5,659,542 A | 8/1997 | Bell et al. |
| 5,673,265 A | 9/1997 | Gupta et al. |

(Continued)

*Primary Examiner*—Alpus H. Hsu
(74) *Attorney, Agent, or Firm*—Dennis T. Griggs; Scott T. Griggs

(57) ABSTRACT

Broadband integrated services are performed via digital, channelized or optically coded networks by a system which organizes, interfaces, provisions, loads and controls, in real time, the transport of grouped or organized information (such as packetized cell data) through interface access devices and packet switches that are compliant with domestic and international communication standards. A packet core network includes multiple packet switches and interface access devices coupled to an existing narrowband or broadband network. A signaling manager, a provisioning manager and a traffic manager perform all broadband and narrowband routing, port provisioning and connecting functions for all network devices. A set of software interface modules for each equipment vendor allows the provisioning manager, the signaling manager and the traffic manager to impose control demands and make network management decisions on a real time basis via an application protocol interface. Bit error rate caused by the disparity between low speed (such as TDM) networks and high speed (such as OCR) networks is substantially reduced by synchronizing the overall network and all switching components to a primary reference clock that has an accuracy of $1 \times 10^{-11}$ second per month or better.

15 Claims, 4 Drawing Sheets

U.S. PATENT DOCUMENTS

| | | |
|---|---|---|
| 5,740,176 A | 4/1998 | Gupta et al. |
| 5,742,762 A | 4/1998 | Scholl et al. |
| 5,764,955 A | 6/1998 | Doolan |
| 5,799,017 A | 8/1998 | Gupta et al. |
| 5,864,542 A | 1/1999 | Gupta et al. |
| 5,896,440 A | 4/1999 | Reed et al. |
| 5,920,562 A | 7/1999 | Christie et al. |
| 5,999,525 A | 12/1999 | Krishnaswamy et al. |
| 6,014,378 A | 1/2000 | Christie et al. |
| 6,016,319 A | 1/2000 | Kshirsagar et al. |
| 6,023,474 A | 2/2000 | Gardner et al. |
| 6,026,091 A | 2/2000 | Christie et al. |
| 6,035,028 A | 3/2000 | Ward et al. |
| 6,052,371 A | 4/2000 | Lemieux |
| 6,055,232 A | 4/2000 | Ward et al. |
| 6,070,188 A | 5/2000 | Grant et al. |
| 6,081,518 A | 6/2000 | Bowman-Amuah |
| 6,081,525 A | 6/2000 | Christie et al. |
| 6,111,673 A * | 8/2000 | Chang et al. .................. 398/79 |
| 6,208,622 B1 * | 3/2001 | Makrucki .................... 370/252 |
| 6,304,549 B1 * | 10/2001 | Srinivasan et al. ......... 370/230 |
| 6,563,827 B1 * | 5/2003 | Brueckheimer et al. . 370/395.1 |
| 6,754,210 B1 * | 6/2004 | Ofek ........................... 370/389 |
| 6,778,538 B2 * | 8/2004 | Landaveri et al. ........... 370/397 |
| 6,804,229 B2 * | 10/2004 | Landaveri et al. ........... 370/386 |
| 6,885,661 B1 * | 4/2005 | Hopper et al. ............... 370/354 |
| 2002/0057680 A1 * | 5/2002 | Ofek et al. .................. 370/372 |

* cited by examiner

TRAFFIC MANAGER, GATEWAY SIGNALING AND PROVISIONING SERVICE FOR ALL PACKETIZED NETWORKS WITH TOTAL SYSTEM-WIDE STANDARDS FOR BROADBAND APPLICATIONS INCLUDING ALL LEGACY SERVICES

CROSS-REFERENCE TO RELATED APPLICATIONS

This application is a continuation of application Ser. No. 09/686,321 filed Oct. 10, 2000 now U.S. Pat. No. 6,522,629.

STATEMENT REGARDING FEDERALLY SPONSORED RESEARCH OR DEVELOPMENT

Not applicable.

BACKGROUND OF THE INVENTION

This invention relates generally to the management and control of broadband integrated services performed via digital, channelized, packetized or optically coded networks, and in particular a system for organizing, interfacing, managing, loading and controlling, in real time, grouped or organized information (such as packetized data) transported through interface access devices and switches that are in compliance with domestic and international communication standards. Further, the invention relates to the deployment of signaling in a packetized network utilizing technology such as Asynchronous Transfer Mode (ATM), which maximizes utilization of components and segments of existing networks while simultaneously providing a high bandwidth platform to support commercially competitive telecommunications and information services as well as providing a bridge between various packet protocols, modulation techniques and access technologies.

Traditional U.S. long-distance and local telephone companies do not offer the enhanced data transfer capabilities that modern business operations need. They began in the 1960's with pulse coded modulation/time division multiplexing (PCM/TDM). These systems and networks typically use digitally channelized multiplexers designed to carry voice transmissions onto individual transmission interface media (e.g., copper wire, coaxial cable, optical fiber and wireless). Base services are typically provided at 64 Kbps (DS0 channels), and corporate service with T1 (1.54 Mbps) transmission speed, which is equivalent to 24 DS0 channels. In Europe and Asia the standard is E1 (2.04 Mbps) which provides for 30 DS0 channels.

The time division multiplexing ("TDM") technique divides the data switching or transmission bandwidth of the network facility into equal sized time slots, which have the appropriate bandwidth needed to carry a telephone voice conversation. TDM generally served its purpose when the network was primarily used for standard telephone voice transmission. However, modem telecommunications networks are now being used to transmit internet protocol (IP), video, full duplex and data in addition to voice. These services are being expanded to accommodate PCS cellular services as well as traditional telephone services. Each of these applications has varying data transmission bandwidth requirements that differ from each other and from requirements associated with traditional TDM telephony. As a result, traditional narrowband digital techniques such as TDM have not been able to fully accommodate the information and data transmission requirements of broadband equipment.

Moreover, in conventional narrowband TDM telephone networks, each circuit has a fixed bandwidth. Once a voice connection is established, its bandwidth cannot be used by any other connection, whether there is any traffic flowing or not. For instance, once a voice connection is established, a bandwidth of 56 kilobits per second is allocated for voice and 8 kilobits per second is allocated for signaling, thereby consuming 64 kilobits per party for the duration of the connection. When one of the parties is listening to the other party, the listening party does not generate any traffic. Although that allocated bandwidth is not used during such silent periods, it cannot be used to transfer any other traffic. That is, the channel bandwidth is occupied and consumed whether it is being used or not. Accordingly, there is a need for a network management system that makes efficient use of available bandwidth resources by allocating and consuming bandwidth only when payload traffic is present.

Packet technologies such as Asynchronous Transfer Mode (ATM) and packet internet protocols (IP) such as IPV4 and IPV6 technologies are now being applied to the switching and transmission facilities and to the physical and logical interfaces of public networks as well as private LAN and WAN networks. For example, where TDM uses time slots to divide the bandwidth into fixed size channels, ATM uses 53 byte cells to divide the bandwidth into virtual channels. Each cell includes a header that identifies a virtual path and virtual channel to which the cell belongs. Cells are allocated to a virtual channel in response to the needs of the users sending information over the virtual channel, subject to the limits of the transmission facilities, physical interfaces and switches that carry the virtual channel.

Private communications networks have been using packetized technology and are now using Ethernet, Gigabit Ethernet, X.25, various light wave products and wireless products in addition to ATM and IP to service customers over a large geographic area. In practice, it is not cost effective for a private network operator to install its own transmission facilities between different sites. Instead, private network operators often lease transmission lines from a public carrier. As a general rule, these leased lines are dedicated and designed to provide full transmission capacity 24 hours a day regardless of actual utilization. A large network of leased lines is typically required to provide connections between sites in a private network.

Referring to FIG. 1, a typical legacy telecommunications network includes narrowband and special purpose broadband networks. In all such conventional high bandwidth networks, operators have constructed large and often specialized networks to accommodate the specific kinds of information or data transmission required by the enterprise. These included, among others, PSTN (Public Switched Telephone Networks) optimized for channelized circuits or switched voice, with overlay of packetized networks that have various protocol interfaces for handling IP internet protocols, LAN and WAN, and cable and broadcast television networks. Because many of these specialized networks were built for peak voice load conditions, the average utilization or information throughput was very low and resulted in expensive unused capacity. There is therefore a continuing interest in providing a telecommunications network that will support not only internally generated enterprise communications of diverse types but also carry communications of diverse types originated by third party subscribers.

The principal requirement of a modern network is its ability to handle video and data as well as voice traffic to and from diverse devices. One efficient way of providing such services is to logically allocate the resources of an existing network in cooperation with dynamic traffic paths provided by packetized networks. An effective arrangement is to overlay a number of logical networks, referred to herein as virtual private networks, each including nodes or switching devices and interconnecting logical links. Each virtual network forms a logical traffic path through an existing network. The logical links of the virtual networks share the capacities of physical links present in the existing physical network.

A physical network may consist of physical nodes formed by packet switches, routers, broadband interface access devices, customer-side interface access devices, physical links interconnecting the nodes and various ancillary devices. A physical link or "backbone" utilizes a transport medium such as copper wires, coaxial cables, fiber optical conductors, and/or wireless radio links, individually or in combination. In general, the physical links are arranged into trunk groups or circuit groups which extend between the physical nodes. There are access/egress interface access nodes to the physical network, to which access devices, such as telephone sets computer modems, cable modems or wireless devices are connected.

Information, whether channelized or packetized, such as voice, IP, video and data, is transported across the packet network by different transport means, for example STM (Synchronous Transfer Mode) and ATM (Asynchronous Transfer Mode).

A broadband packetized services digital network handles both data transmissions (e.g., computer) and telecommunications (e.g., telephone). This carrier service provides high speed communications to end users in an integrated way. Typically, the technology selected to deliver the service is photonic or electrical with digital or analog coding using modes such as Asynchronous Transfer Mode (ATM), or Gigabit Ethernet (Gig E), or Internet Protocol (IP), switched or multiplexed, but is not limited to these technologies. The almost universal acceptance of ATM for broadband networking is because ATM handles all kinds of communication traffic, such as voice, data, video, high quality sound and multimedia. ATM can be used in both LAN (Local Area Network) and the WAN (Wide Area Network) network environments and hence enables seamless inter-working between the two.

ATM and Gig E packet protocols transported over such media as WDM or DWDM are effective in a much wider range of communications environments than any previous technology. ATM or Gigabit Ethernet or IP generally is applied at OC48 or lower bandwidth requirements, whereas switched photonic DWDM or WDM would be more efficient at multiple OC48s or higher. This means that instead of having a proliferation of many specialized kinds of equipment for different functions it is now possible to have a single type of equipment and network that will accommodate a wide range of services.

Communication technologies have realized considerable progress and many potential applications that were not possible before are now becoming accessible and attractive. High speed traffic rates can now be sustained with very low bit error rates with the development of new transmission media, and especially optical fiber. The increasing user demand for packetized broadband communication services and for ever faster services has caused carriers to look for an integrated way of supplying these services, since operating disparate networks is very expensive.

As data transfer speeds for network communications increase, timing among network system components becomes increasingly critical. Due to the high data transfer speeds, synchronization between the network elements must be maintained to avoid quantization noise distortion and bit error rate. Conventional networks are synchronized at 4 KHz which is the standard clock frequency. Conventional 4 KHz network clocks provide an accuracy of $4.6 \times 10^{-6}$ second per month. However, as networks are implemented with optical switching, for example OC3, OC48 and higher, the network switches run at much higher frequencies, for example 1.92–2.6 gigaHz. The optical switching devices are still being synchronized with the conventional 4 KHz network clocks which provide an accuracy of only $4.6 \times 10^{-6}$ second per month. The disparity between the optical signaling frequency and the sampling clock frequency causes the accumulated network bit error to become very high, resulting in jitter, frame slip on video, noise distortion and delay on voice-over-IP, router delay or latency, which generally do not satisfy QoS requirements.

The accumulated bit error becomes significant and is manifested visually as frame slips or blocks missing from packet transmissions, which is commonly encountered on cable television networks. It may also be heard as a hum or echo in a normal telephone call, and as delay in voice-over-IP transmissions. If the network switches are not synchronized, the bit error rate and the packet delay become completely unacceptable for some traffic. For example, some routers may require as much as 200 milliseconds to make a routing decision, and that must be added to the response time of the signal as it propagates over the network paths. The direct result is phase jitter, packet delay and quantization distortion. These are all problematic especially for voice and video conferencing transmissions, which require the highest quality of service, where the overall packet delay must not exceed about 40 milliseconds.

A further limitation on conventional broadband networks is caused by the lack of common standards and operating rules among diverse narrowband and broadband network devices, which prevents them from communicating directly with each other by a common network protocol. The protocols of conventional network equipment are vendor specific, and such equipment is generally not certified for operation under a common set of national and international rules, for example IEEE and ITU standards. The lack of standardization among all network equipment is the direct cause of a substantial portion of noise, jitter, cell loss, phase shift, congestion, over-subscription and packet delay, thus generally degrading the quality of service performance across the network.

SUMMARY OF THE INVENTION

The present invention provides a comprehensive high bandwidth solution for significantly increasing capacity in domestic and international networks through utilization of ITU and IEEE packetized services such as standardized Asynchronous Transfer Mode (ATM) systems and equipment. The packet network solutions of the present invention can be operated across conventional data circuits (for example, DS1 to OC3 circuits) that are generally available for lease from existing public switched telephone network (PSTN) companies. The use of commercially available telecommunications circuits has the advantage of allowing rapid, wide area deployment while limiting overall capital investment.

Broadband integrated services are delivered via digital, channelized or optical networks by the packetized network of the present invention which organizes, interfaces, provisions, loads and controls, in real time, the transport of grouped or organized information (such as packetized cell data) through interface access devices and packet switches that are compliant with domestic and international communication standards. The packet core network of the present invention includes multiple packet switches, routers and interface access devices coupled to an existing narrowband or broadband network. Service software modules consisting of a traffic manager, a provisioning manager and a signaling manager perform all broadband and narrowband routing, port provisioning and connecting functions for all network devices. A set of software interface modules (SIM) for each equipment vendor allows the provisioning manager, the signaling manager and the traffic manager to make network management decisions on a real time basis via an application protocol interface. Bit error rate caused by the disparity between low speed (such as TDM) networks and high speed (such as OC3) networks is substantially reduced by synchronizing the overall network and all switching components with a highly accurate primary reference clock.

The signaling manager manages virtual (logical) circuits, paths and/or virtual channels in the overall packet network. The signaling manager is in direct communication with at least one packet switch or router in the packet network and in indirect communication with all other switches, routers and interface access devices of the network. The signaling manager receives its working instructions from the traffic manager and from the provisioning manager for each packet switch, router and interface access device of the packet network, which, among other things, enables the signaling manager to set up and dynamically change virtual circuits, paths and channels on a real-time basis. The signaling manager also has the ability to dynamically control the assigned parameters (e.g., bandwidth and QoS) of the virtual circuits.

The provisioning manager is the primary provisioning element for non-real time circuits in the packet network. It performs broadband and narrowband network end point connections and port provisioning. It includes a customer specific technical rules processing engine, a network modeling function, a complete graphical network management system, a load capacity management system and a network element manager that can interface with a wide variety of different network element types. The provisioning manager informs the signaling manager who the customer is, what the customer has contracted for, and all of the pertinent information about the customer, including billing/Call Detail Record (CDR) arrangements.

The traffic manager drives the signaling manager, per traffic control rules and information received from the provisioning manager, for controlling the dynamic loading of the network on a real time basis. Under traffic manager control, the signaling manager provides real time live interaction between the narrowband equipment and the broadband equipment, monitoring each transaction moving through the network and verifying that routes are available, verifying that appropriate routing decisions are being made, and verifying that the network resources and bandwidth circuits are available. The traffic manager establishes the rules based on empirical real time statistical algorithms for loading the network routers and switches with a knowledge-based intelligent modeler over the transport layers for optimum performance and maximum network efficiency. The traffic manager enforces these operations with a set of business rules based on QoS requirements which determines how traffic is to be loaded on a dynamic, real time basis.

Bit error rate caused by the disparity between the signaling frequency and the sampling frequency encountered in the operation of high speed networks (such as OC3) is substantially reduced according to the present invention by synchronizing the entire network and all clocked components of the packet network with a primary reference clock, preferably a national standard clock that has an accuracy of $10^{-11}$ second per month or better. Also, synchronized timing is maintained throughout the network by synchronizing the combined outbound data bit stream including payload to the primary reference clock.

Some of the limitations imposed by the operation of diverse broadband and narrowband equipment are overcome, according to the present invention, by utilizing network equipment that has been certified for operation under a common set of national and international rules, for example IEEE and ITU standards, so that a predetermined quality of service (QoS) can be guaranteed and maintained throughout the network. To achieve this, the broadband and narrowband switches and other items of network equipment are operated under common network-to-network interface relationships. With common operating protocol relationships, a reduction in the number of switching operations can be achieved, thereby reducing overall delay, distortion and noise.

BRIEF DESCRIPTION OF THE DRAWING

The accompanying drawing is incorporated into and forms a part of the specification to illustrate the preferred embodiments of the present invention. Various advantages and features of the invention will be understood from the following detailed description taken in conjunction with the appended claims and with reference to the attached drawing figures in which:

DETAILED DESCRIPTION OF THE INVENTION

Figure 1:
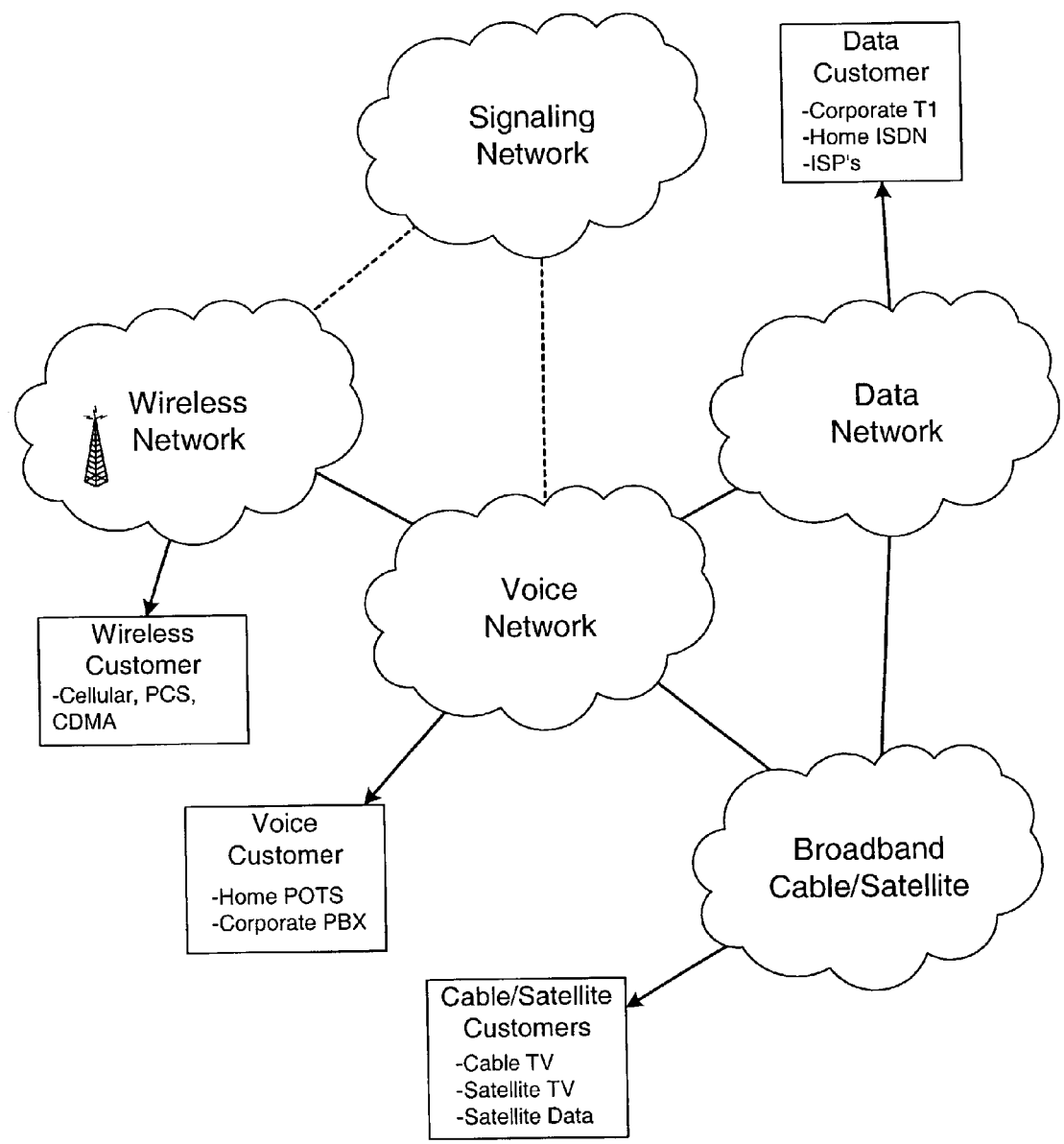
FIG. 1 is a simplified block diagram of a telecommunications network including independent narrowband and broadband networks providing diverse services.

Preferred embodiments of the invention are described below with reference to various examples of how the invention can best be made and used. Like reference numerals are used throughout the description and several views of the drawing to indicate like or corresponding parts.

Packet System Architecture

Figure 2:
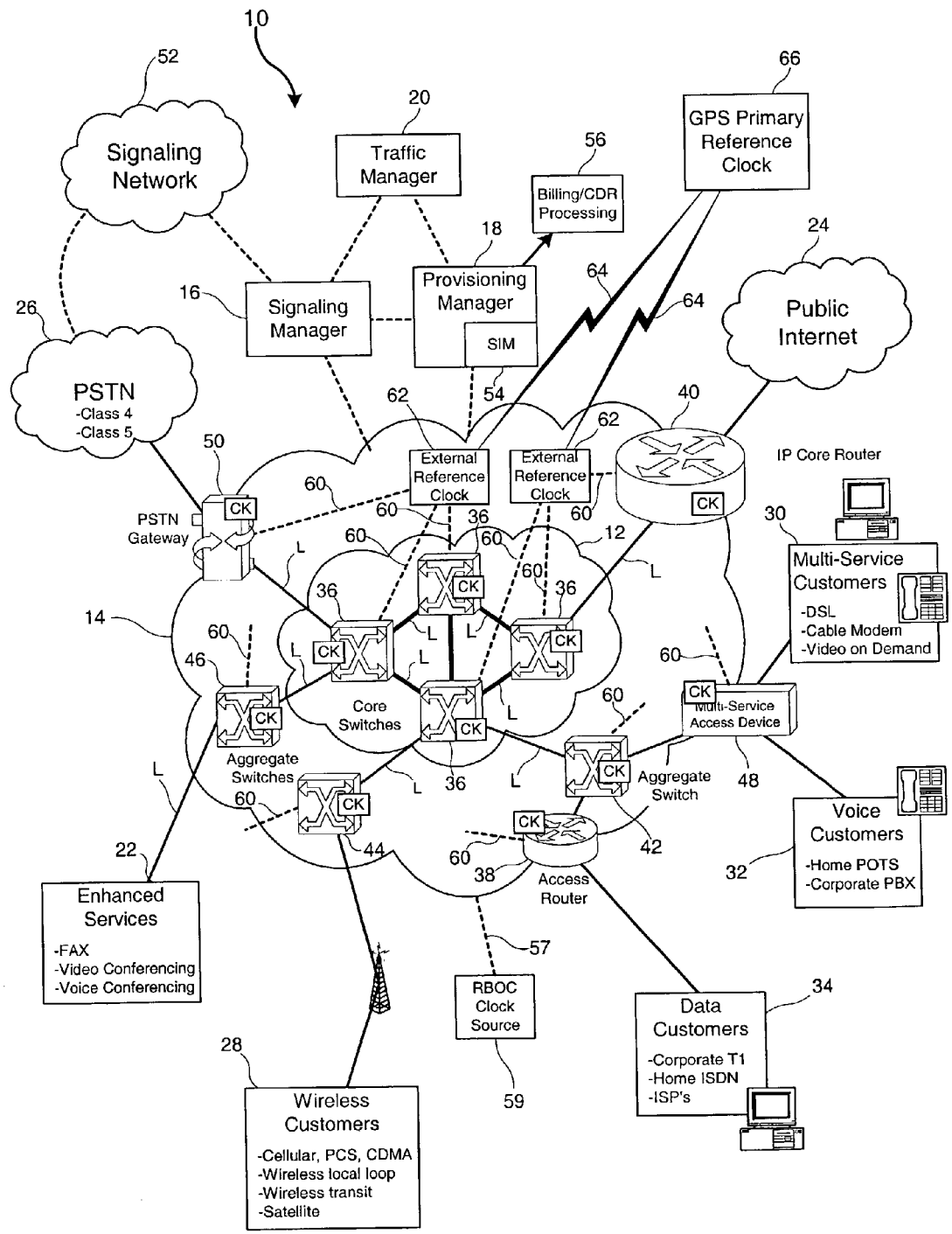
FIG. 2 is a simplified block diagram of the telecommunications network of the present invention which integrates the independent narrowband and broadband networks into a high bandwidth platform which provides broadband integrated telecommunications and information services to diverse customers.

A telecommunications network 10 constructed according to the present invention provides high bandwidth services to existing narrowband networks and broadband networks. Referring to FIG. 2, the telecommunications network 10 includes a packet core network 12, a physical network 14, a signaling manager 16, a provisioning manager 18 and a traffic manager 20. The service access nodes connect the packet core network 12 to various services including enhanced services access 22, ISP access 24, PSTN access 26, wireless access 28, multi-service customer devices 30, 32 and data customer devices 34.

Referring again to FIG. 2, a number of broadband packet switches 36 are interconnected by links L within the core packet network 12 on top of the physical network 14, which includes narrowband and broadband networks. The core packet network and the physical network are managed and controlled by the signaling manager 16, the provisioning manager 18 and the traffic manager 20. The logical nodes of the core packet network comprise the physical switches 36, routers 38,40, interface access devices including aggregate switches 42, 44, 46, multi-service access devices 48 and gateway access devices 50 that are capable of receiving and transmitting packetized data. Further, the core packet network 12 comprises logical links L interconnecting the logical nodes. For each node in the packet network there is associated a routing table, which is used to route a connection from node to node throughout the packet network starting from the node associated with the terminal that originates the connection and ending at the node associated with the terminal which terminates the connection. These nodes together form an origin-destination pair.

For optimum network performance, it is necessary to decide how to configure the logical networks on top of the physical network and how to efficiently manage and allocate the physical network resources among the logical networks and to balance traffic loading. Because the logical networks share the same physical network capacities, there is a trade-off between quality of service (QoS), bandwidth and cost so as to optimize the overall network performance, in particular when considering a large and complex network. Further, the network performance is also affected by the distribution of offered traffic load among the various routes, is complicated by the requirements of point-to-point and point-to-multipoint virtual services, and varies according to time of day, QoS and services offered according to existing traffic tables, for example Erlang and Poisson traffic tables.

Figure 3:
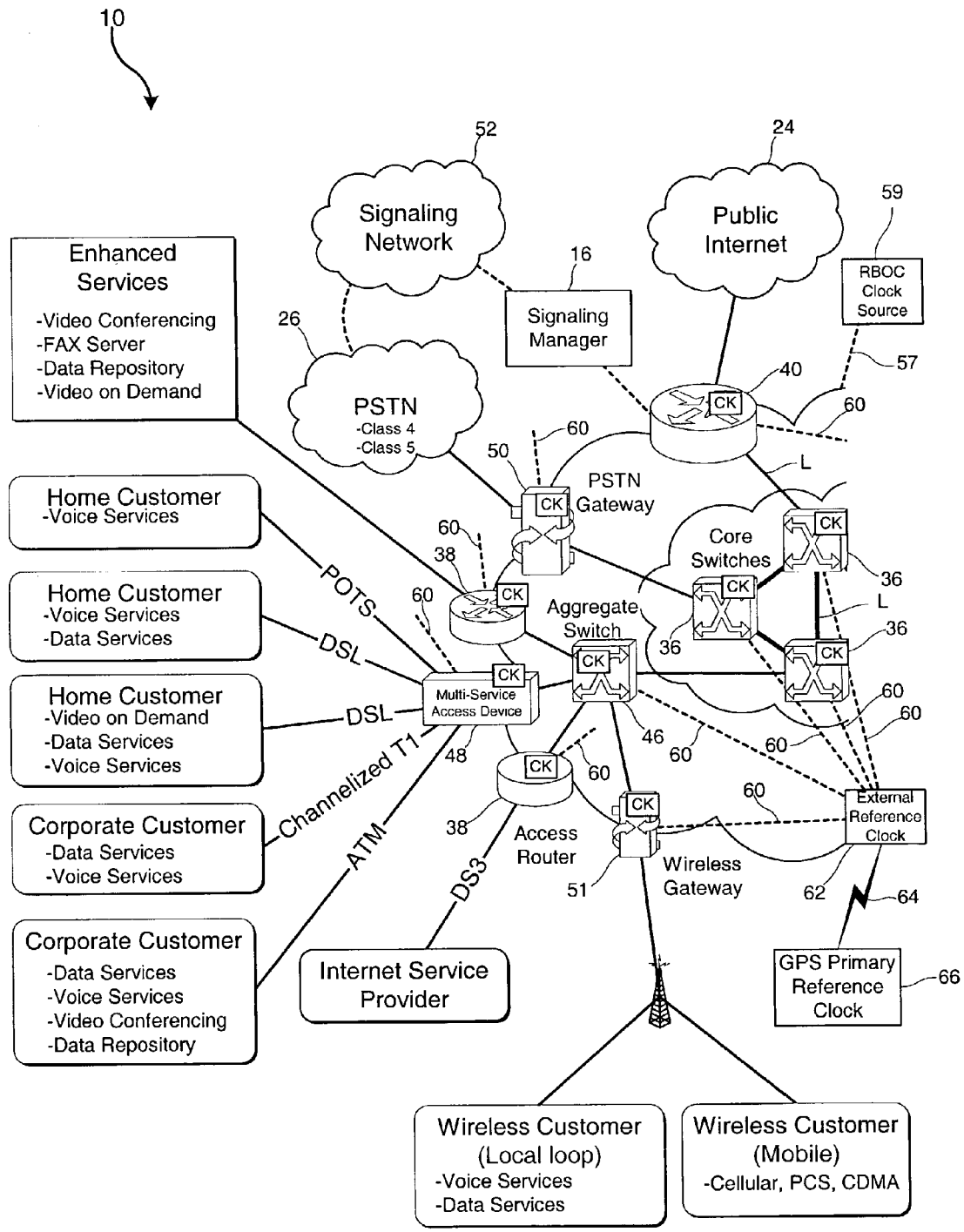
FIG. 3 is a simplified block diagram which shows connectivity details from service providers through the core packet network to the end user.

Referring to FIG. 3, each packet switch 36 uses cell multiplexing to concentrate multiple packet protocols including, but not limited to, packet ATM, frame relay, HDLC as well as constant bit rate sources onto a single T1 or E1 access facility to the core network. Preferably, each packet switch 36 is connected to the packet core network 12 by a T1 or E1 link L (physical interface transport medium, for example, copper) using a UNI protocol.

The packet switches, for example ATM switches, are connected as access concentrators in small network configurations and also medium to large network configurations. The switch requirements and capacity are different for each case.

Large capacity packet switches and routers have a wider variety of interfaces from 64 Kbps Frame Relay to OC-3/STM-1 ATM UNI. As shown in FIG. 3 for use in medium to large size networks the router 38 connects packet or Frame Relay data; Video Codecs provide for V.35/RS449/CBR connections; telephone voice input from PBXs connect over T1/E1 circuit emulation and CBR circuit emulation is supported. Preferably, the packet switches 36 are connected to the packet network by a T1 or E1 line using a UNI protocol.

The packet solution of the present invention accommodates all available packetized protocols, transmission technologies for both private and public local networks, which are coupled to a public network via bilateral network interface access and egress devices. The virtual private or public local network will typically include multiple packet switches such as ATM or DWDM switches that are interconnected with one another via one or more physical transmission interfaces L (e.g., fiber optic, copper wire, coaxial, or wireless) to form a core packet virtual path network, which can span over a small or large geographical area. Customers using the core packet network generally have a local private network, such as a local private data network and/or a local private voice network. The customer's local private network is interconnected to a carrier's network backbone via a common communication infrastructure provided by the service provider, and shares transmission facilities with other networks. Virtual connections (e.g., virtual circuits, virtual paths, virtual channels, groupings of virtual paths, and any combination thereof) extend from one packet switch to another packet switch through the private or public network and are used to transfer various types of information or data across the core network.

The principal concepts of packet switching/transmission are as follows:

Cells: all information (voice, image, video, data, IP) is transported through the network in very short, fixed length (for example, 48 data bytes plus a 5-byte header) blocks referred to as cells. The cell size was determined by the CCITT (now called ITU) as a compromise between voice and data requirements.

Routing: information flow along circuits or paths (called "virtual channels") is set up as a series of pointers through the network. The cell header contains an identifier that links the cell to the correct path towards its destination. Cells on a particular virtual channel always follow the same path through the network and are delivered to the destination in the same order in which they are received.

In the packet network 12, a user can communicate information with another user through a connection, referred to as a virtual circuit, established in the network. The connection may carry voice, IP, video, and data in fixed-size cells of 53-bytes, which include a 5-byte header and a 48 byte payload field. The connection can support a wide range of services defined by a set of quality of service (QoS) parameters.

For transmission through an ATM network, the ATM Forum standard, Traffic Management Specification Version 4.0, ATM Forum/95-0013R10, February 1996, defines a set of QoS parameters that characterize the end-to-end connection performance. When establishing a connection through an ATM network, a user negotiates with the network the set of QoS parameters that characterize the connection. The particular set of QoS parameters depends on the type of service that the user requests from the network. These services include constant bit-rate (CBR), variable bit-rate (VBR), available bit-rate (ABR), and unspecified bit-rate (UBR).

For example, through a call admission control procedure, a user signals a request for a new connection in the network, and the network makes a decision to accept or reject the new connection request depending on the specified QoS and the available network resources. Generally, the network accepts a new connection if the network determines that the available network resources will be sufficient to satisfy the specified QoS. If the network accepts the new connection, the network implicitly agrees to a traffic contract that requires the network to sustain the specified QoS and guarantees the QoS connection will conform to the negotiated traffic contract.

Signaling Manager

Figure 4:
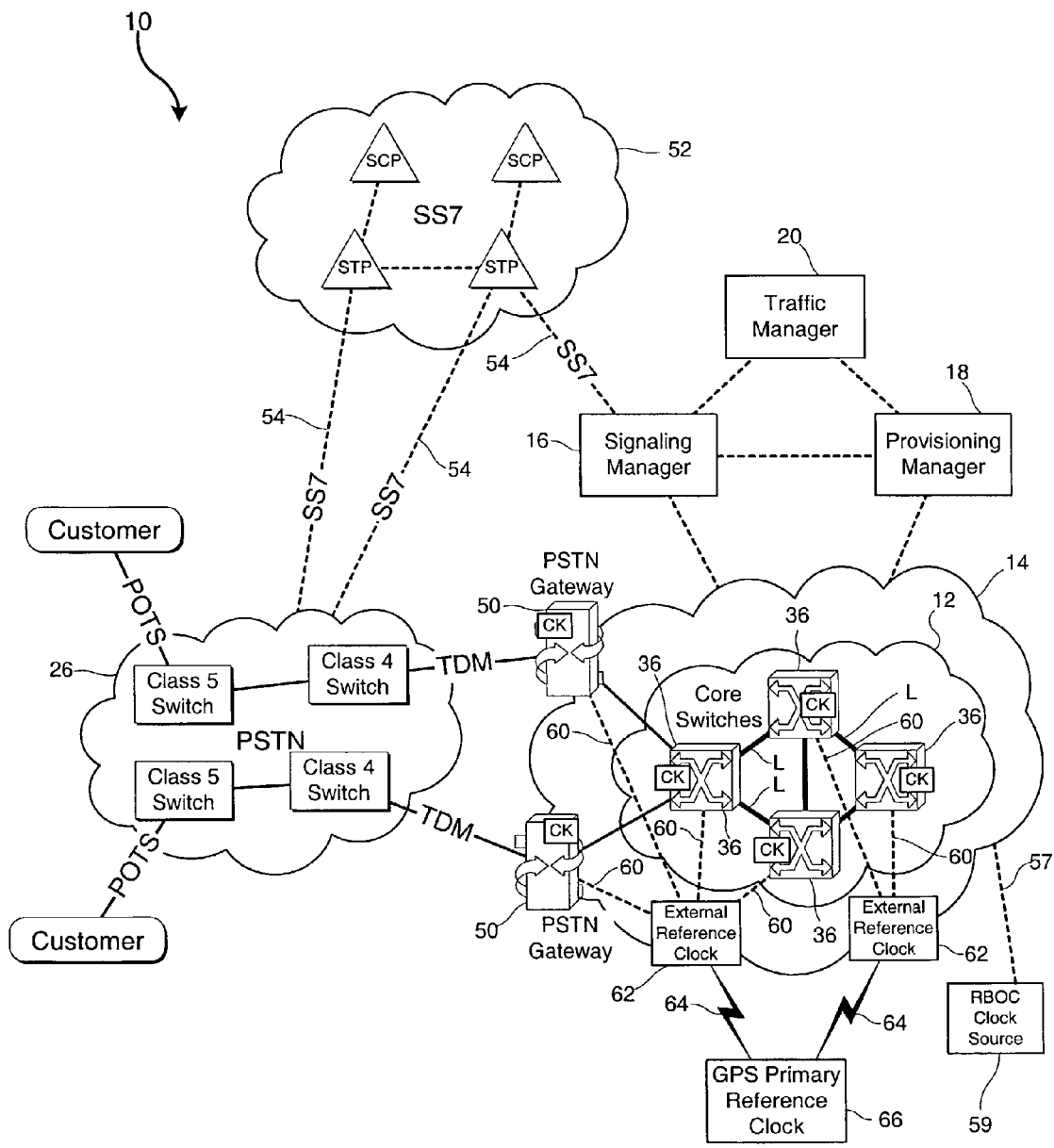
FIG. 4 is a simplified block diagram which illustrates interchange signaling management between SS7, the packet core network and PSTN networks.

The signaling manager 16 controls the interchange of signals between a signaling network 52 (for example SS7) and the packetized network 12 of the present invention. Referring to FIGS. 2 and 4, the signaling manager 16 is generally embodied on an ATM WAN. The ATM WAN includes a toll switch, an ATM switch and an interface access device. The toll switch communicates with the signaling manager 16 via SS7, preferably over an OC3 transport interface 54.

Signaling packet requests allow signaling entities to exchange messages for any service or information request. Each service group has one signaling or information packet request; the signaling packet request controls the resources for all the service requests.

The signaling manager 16 considers one or more factors to determine whether the virtual connection through the core network can be made. These factors include, but are not limited to, terms and conditions of a customer agreement covering the virtual connection, type of information that the virtual connection will transfer (e.g., constant bit rate information, voice information, video information, variable bit rate information, data information, connection-oriented information, frame-relay information, and connectionless information), the quality of service (QoS) expected of the virtual connection, existing traffic load of the network, and the utilization of the network. In particular, the signaling manager determines on an ongoing basis network path availability. The signaling manager 16 also checks the path loading conditions and determines whether a proposed virtual connection can be set up for a particular network circuit or channel.

Similarly, the reference to the customer service agreement concerning the customer's use of the core packet network 14 defines acceptable quality of service (QoS) requests for virtual connections that are available to the customer. The signaling manager (i) refers to the customer service agreement to determine whether the parameter requirements of the virtual circuit connections are compliant with the agreement, (ii) checks with the agreement governing quality of service requests to determine whether the quality of service requirements of the virtual connections are compliant with the agreement, and (iii) determines whether there is sufficient bandwidth for the proposed virtual circuit connection. If the network is not in an overload condition and the traffic manager 20 does not otherwise object to the creation of the virtual circuit connection, the virtual connection is established.

The signaling manager 16 manages each packet core router or switch dynamically and continuously, which allows for greater use of the available capacity of networks and, particularly, transmission facilities within the physical network 14. This enables telecommunications providers to lease otherwise idle bandwidth capacity to other customers on an as-needed basis. Some of this capacity may, in fact, be owned by another party or already be leased to another party, but is not being used at the specific time that another party requests permission to use the capacity.

The physical network 14 has a number of access devices connected to the packet core network 12 at the customer's switching sites. These access devices are used to translate the voice, video or data channels from a source including TDM voice into a packet payload stream for point-to-point or point-to-multipoint transport. Each packet switch and router is interconnected to an optical or electrical transport medium to establish the core network. The voice packet stream is passed between the packet switches or routers and translates into TDM at the egress access device. The signaling manager interchanges signaling between SS7 and packet integrated signaling for the network. System loading is determined by the traffic manager 20, not by the switch vendor. The signaling manager 16 is compliant with ANSI standard SS7 and C7. Preferably, add-on packages are used to support stack integration with the ITU C7 standard. The signaling manager 16 translates the data from, to, or within widely used ITU and/or ANSI compliant signaling systems and protocols and ATM Q.2931 (UNI 4.0) gateway signaling to establish ATM switched virtual connections (SVC).

The user interface is a provisioning GUI interface using a standard object-oriented database interface over IP protocol.

According to the preferred embodiment of the present invention, Bellcore standards for CDR bill processing are required from all vendors of core switching. Billing/Call Detail Record (CDR) data in a non-rated raw form may be available or customized from the customer access side, or from the core network provider. When the call terminates, the billing/Call Detail Record (CDR) is closed and recorded to a file for bill processing.

Preferably, the core packet network 12 has a fault-tolerant architecture. This provides failover capability where hardware faults are detected and failover is done immediately with no loss in call-processing capability. The preferred approach to fault tolerance is hardware redundancy. This requires a minimum of twin servers that are hardware synchronized and running in lockstep. Any hardware faults would cause the signaling operation to switch to the standby server that is running an identical copy of the software and is at the exact same point in the program as it is executed.

The signaling manager 16 uses proprietary business rules. GUI preferably uses circuit ID naming rules for IDTs, endpoints and connections such as the CLLI naming convention. The signaling manager also allows mapping, translation of provider trunk groups to packet addresses, and mapping for TDM to packet-per provider's network.

The signaling manager 16 has call exclusion rules for QoS, including QoS rules on connections (e.g., per trunk group, per time of day). The signaling manager receives its instructions from the traffic tables resident in the traffic manager. Billing/Call Detail Record (CDR) data caching and logging sizes and intervals are specific to provider.

The preferred hardware platform for the signaling manager 16 is Sun Microsystems Netra FT1800 or equivalent and the preferred operating system is Sun Microsystems Solaris 2.6 or equivalent.

Provisioning Manager

The provisioning manager 18 is the primary provisioning element for the entire telecommunications network 10 and each piece of equipment. The provisioning manager performs all broadband and narrowband network routing, connections and port provisioning for large as well as small networks.

Provisioning of the network 10 is accomplished via the provisioning manager 18 and provisioning software. The provisioning manager 18 provisions the packet switches 36 via the packet switch provisioning server. This is a component of the provisioning software. The provisioning manager 18 also provisions the access devices via the appropriate packet switch SNMP MIB. Logical ports are provided in each packet switch; physical and logical ports are provided in the access devices; timeslot translations are provisioned in the access devices and PVCs; and cross-connections are provisioned in the core switches and the access devices.

With the implementation of the signaling manager 16, the provisioned connections are established via SVC connections.

The provisioning manager 18 has GUI interfaces that enable provisioning (creating, modifying and tearing down connections) of network elements, application endpoints, inter-device trunks (IDT's) and circuit connections. The provisioning manager also includes a graphical representation of the network in a Java GUI that allows network management functions such as alarm management and monitoring. Further, the provisioning manager has a capacity management GUI for monitoring the allocation of bandwidth between network elements.

The provisioning manager 18 persistently stores the entire network model in a local or remote database. The database is modeled such that network objects are stored directly as objects. The provisioning manager provides the following capabilities to the telecommunications network:

1. provisioning rules processing engine;
2. a network modeling function;
3. a complete graphical network management system;
4. capacity management system;
5. a network element manager 54 that can interface with a wide variety of different network element types; and,
6. maintains a database 56 of raw billing/Call Detail Record (CDR) data for all real-time and non real-time circuits in the core packet network.

The provisioning manager 18 is equipped with a redundant server for high availability. The purpose of the standby server is to provide a highly available backup where the ability to provision services can be restored quickly in the event of hardware failure. Lockstep fault tolerance is not required. A primary server includes mirrored disks and dual CPUs to provide a level of hardware redundancy. The primary server may be in one location and a duplicate standby system may be located in another geographic location and will be periodically refreshed with data from the primary server. Each transaction need not be replicated, but a periodic database refresh will keep the standby server synchronized. The period of refresh may be adjusted as low as 2 seconds, or may be performed on demand. There is a window of time (<=refresh rate) where transactions may be delayed.

The provisioning manager 18 makes use of the element manager 54 to provide an industry-standard interface to a variety of network elements. The element manager 54 is a multi-threaded server that encapsulates all of the network element functionality in its interface. The provisioning manager 18 makes use of this interface to accomplish provisioning of network elements. The element manager provides interfaces for each network element. These components and network elements are defined during the customer's requirement phase and may be added as plug-in modules at any time.

As ports are added to the provisioning manager 18 via the Java GUI, they are written to the packet switch or switches 36 as logical ports via an applications protocol interface (API) into the provisioning software server. The packet switch provides this API interface. This API is used upon "Add," "Delete" and "Update" operations. Also, upon GUI demand, the provisioning manager may connect all known logical ports in the database to the switches via this API.

The provisioning of each interface access device is accomplished via an SNMP interface to the devices. The MIB for this interface is provided by the packet switch. The provisioning manager 18 uses this interface to set up the logical ports in the access device, and provide mapping from the TDM timeslots to the virtual connections.

The provisioning manager 18 serves primarily as an inventory computer because it manages mass data derived from very large data bases. The preferred hardware platform for the provisioning manager is the Sun Microsystems Enterprise 2500 or equivalent. The preferred operating system is Sun Microsystems Solaris 2.6 or equivalent.

Traffic Manager

To efficiently distribute the offered traffic load across the network 10, the traffic manager 20 consults Erlang and Poisson-type traffic loading tables as they are applied to the packet network for a particular service and QoS requirement. According to an important feature of the invention, Erlang and Poisson-type traffic loading tables are provided for broadband traffic. These tables are based on real time empirical data gathered from testing and are continuously updated with traffic loading data acquired from real time network operation. The traffic loading data is collected directly from the network by the provisioning manager 18, and then sent to the traffic manager 20 for computation. The data computations are then employed in connection with basic models that the traffic manager uses, computes traffic loading information and hands it to the signaling manager 16 and the provisioning manager 20.

This information allows the traffic manager 20 to keep the traffic loads balanced for peak efficiency throughout the network, so that a network circuit path is always available for any type of traffic. The traffic manager thus maintains the network optimized and balanced, and operating at a relatively high efficiency, for example up to 35:1 efficiency as compared to substantially lower efficiencies currently realized over conventional national or worldwide networks, while providing the same quality of service. The traffic manager thus has the ability to collect real time data and dynamically determine the mathematical loading and what the empirical loading of the network is, and how it should be loaded for balanced operation.

At the same time, the traffic manager 20 establishes the rules for digit analysis and instructs the network-to-network interface protocols of each network node with respect to the rules it should be operating under. That is, all of the analysis work that is presently being performed internally and separately by components of conventional networks is performed externally by the traffic manager 20, provisioning manager 18 and signaling manager 16.

Because the traffic manager 20 operates essentially as a mathematical manipulator, it has the ability to handle at high speeds those packet manipulations much more quickly than the vendor devices. Consequently, the traffic manager essentially serves as a processing computer. The traffic manager is a mathematical computer constantly performing mass computations, making decisions and analyzing digits and packets based on those computations.

The preferred hardware platform for the traffic manager is Sun Microsystems Netra FT1800 or equivalent and the preferred operating system is Sun Microsystems Solaris 2.6 or equivalent.

Network Synchronization

A network clock signal 57 is obtained from a Bell Regional Operating Center (RBOC) source clock 59 and is input via circuit connectivity to each item of network clocked equipment, including the routers, packet switches, aggregate switches, gateway devices and other interface access devices, and is provided for internal signal sampling and timing of data transfer. Typically, the network clock 57 is a Stratum 3 clock having a free-run accuracy of only about $4.6 \times 10^{-6}$ second per month, and thus does not have the high level of accuracy needed for data sampling and transmission at optical switching rates. For this reason, a more accurate external reference clock signal 60 is used instead for signal sampling and transfer purposes. The network clock signal 57 is used only in a default mode and when the external reference clock signal 60 is lost or otherwise not available.

In the preferred embodiment, an external reference clock signal 60 is input to each network component from an external reference clock 62, preferably a Stratum 1 clock that has a T1 clock frequency of 4 KHz and a free-run accuracy of at least $1 \times 10^{-11}$ second per month. Two or more (as may be needed) external reference clocks 62 are provided for supplying a highly accurate reference clock signal 60 to each clocked component of the network. According to an important aspect of the invention, all of the external reference clock signals 60 are synchronized with a common primary reference clock signal 64 that is provided, for example, by a Stratum 1 primary reference clock 66, preferably the GPS national standard clock operated by the U.S. National Bureau of Standards that has a free-run accuracy of at least $1 \times 10^{-11}$ second per month or better.

The internal timing of each network switch component is synchronized with the primary reference clock signal 64, also referred to as switch fabric timing synchronization. This achieves synchronization of the entire network 10 including all network devices to a high level of accuracy that is needed for data transmission at optical switching rates. The sampling rates and the frequency sources of the network components are adjusted and synchronized to the primary reference clock 66, which has a free-run accuracy of $1 \times 10^{-11}$ second per month or better ($1 \times 10^{-13}$), which is compatible with the highest optical switching rates that are currently in use.

A suitable Stratum 1 external reference clock 62 can be obtained from Symmetricom, Inc., of San Jose, Calif., preferably a Symmetricom Timesource 2500 which outputs a Stratum 1 clock signal at 1.544 MHz (4 KHz standard clock is extracted in DS1 Format). A suitable primary reference clock 66 is supplied by the U.S. Global Positioning Satellite (GPS) broadcast frequency national time standard which is input to each external reference clock 62 by wireless transmission.

Common Standards

Common operating relationships are established so that different items of network equipment are operated under the same protocol, whether it be user network interface (UNI), network-to-network interface (NNI) or private network-to-network interface (PNNI), for all network equipment vendors. That is, the vendor switches and other items of equipment used on the network are required to be compliant with the applicable protocol in the same way, thereby avoiding duplicate network actions and reactions. Each network equipment vendor is required to satisfy and deploy the applicable domestic and international standards within its network equipment.

With this common standards arrangement, the overall network 10 and each item of equipment are controlled by the signaling manager 16, the provisioning manager 18 and the traffic manager 20. This control is implemented through an open architecture application protocol interface (API), BIOS, or SNMP associated with each equipment.

A set of software interface modules (SIM) is maintained for each equipment vendor in the element manager 54 of the provisioning manager 18. Each software interface module provides a "hook" for each network function that can be implemented or reacted on the network via the application protocol interface (API). The provisioning manager 18 communicates with the software interface modules via this API. The information gathered by the provisioning manager is used by the signaling manager 16 and the traffic manager 20 to exercise supervisory monitoring and control of each item of network equipment, without incurring the delay and distortion that would otherwise be imposed by each particular piece of equipment.

According to this arrangement, the signaling manager 16, the provisioning manager 18 and the traffic manager 20, which are external to the network, are able to impose control demands on the network equipment and make network management decisions on a real time basis. The limitations imposed by vendor specific network equipment are by-passed, particularly in terms of cell delay and distortion, whereas the adaptive access operation of the optimized network of the present invention usually functions at maximum network transmission speeds.

System Implementation

The packet network 10 of the present invention provides network intelligence and enhanced calling features. The packet network offers all of the advanced calling features available to subscribers from the circuit switched PSTN carriers. Advanced calling features include call forwarding, call waiting, caller on hold, dynamically established multi-party/multi-location conference calls, video conference calling on demand, fax broadcasting, operations and management, call accounting and digital capabilities. The packet switch equipment specified for the customer-core network in conjunction with a scalable database includes administration management intelligence capabilities that track and manage the interconnects with other networks.

The administration management feature allows monitoring of network to network traffic on a real-time basis using custom filters to prioritize the data collection process. Detailed traffic reports provide the means for controlling interconnect charges and billing/Call Detail Record (CDR) data with other network operators. This is a unique platform that meets all PSTN, telecommunications and Federal Communications Commission (FCC) standards in the U.S.

The packet networking technology of the present invention provides customer-through-core companies, wherever located, with the greatest opportunity available to significantly reduce the operating expenses incurred for circuits and switched calls with long distance telecommunications service providers while simultaneously increasing the available bandwidth or throughput capacity of the telecommunications network. As a unified communications technology, all formats of information progress through the packet network 10 in the same manner. Switched circuit voice calls set up on demand are routed through the packet network as easily as e-mail messages. Packet services eliminate the need for separate circuits and equipment, (e.g., new PBXs) to handle all of the voice traffic generated and received.

The packet network switches 36 dynamically allocate the physical bandwidth available to meet the quality of service (QoS) levels demanded by network users. As all traffic submitted to the packet network is managed by its QoS level, isochronous (low latency such as duplex voice) demands are met first even if the network is close to saturation with lower priority, non-isochronous IP traffic. The unique characteristics inherent in packet QoS permits the network 10 to autonomously route the isochronous traffic with the highest priority and to postpone transport of lower priority traffic, such as bursty WAN type file transfer traffic, to the next available moment. QoS operates even after call sessions have been setup. Through highly efficient QoS traffic management, expensive, separate, duplicate or redundant circuits may be reduced or eliminated without risking unacceptable congestion delays.

Because the packet network 10 is highly scalable, it is capable of transporting domestic and international telecommunications traffic generated by unaffiliated third parties. Transporting third party generated traffic allows maximum utilization of the packet network capacity, particularly during time periods when customer group member traffic is at a minimum. Unaffiliated or "private subscriber" traffic originating on any type of CPE (analog voice, LAN data, video conferencing to native packet format) can be accepted at any packet switch node. Each packet switch node includes PBX class equipment to provide local origination and termination of circuit switched PCM traffic. Other equipment configured in the packet switch nodes may include frame relay access devices (FRADs), broadband access devices (BADS), integrated services digital network interface units (ISDN NIUs), and T-1 data service unit/channel service unit (DSU/CSUs).

With the provisioning manager 18 of the present invention installed, traffic data is captured and billed in the same manner as PSTN carriers bill their traffic (e.g., pay-per-view movie or per event). Customer's pricing can be determined on a per minute, per packet, by distance, by packet cells transported through the network, modified by time of day bands, and many other parameters set to maximize usage in non-peak periods. Revenues generated from packet traffic will offset the recurring operational expense of the packet network.

Packet switching simplifies customer premises equipment by standardizing packet transmission equipment and technologies. Packet switching is inherently a unified, application transparent technology. Voice, video, high bandwidth applications, bursty IP data, and isochronous information move through the same network switches and physical circuits in a simultaneous manner. By adapting packet switching across the network, all formats of information progress through the packet network in the same manner. Packet switching thereby allows any type of CPE to be connected to the packet network access nodes.

Because the packet network itself is indifferent to the originating traffic format, existing PBX equipment, routers, hubs, related access devices, DS0, DS1, OC3, DS3, facsimile circuits, and SONET or SDH interfaces permit seamless connectivity to the wide area packet core networks. Switched-circuit voice calls originating anywhere and set up on demand are routed through the packet network as easily as e-mail messages. Packet switching eliminates the need for separate circuits and equipment, (new PBXs for example) to handle all of the voice traffic generated and received.

Packet traffic in the network is managed with distributed connection admission control ("CAC") algorithms and virtual traffic control manager (TCM) routing. CAC performs admission control for all classes of packet service so that virtual circuit (VC) creation on physical ports can be based upon established QoS objectives. To create a virtual path or circuit through the packet core network, virtual connections must be made through each switch that the virtual path traverses, connects, or through which the virtual path connection extends. Similarly, to create a virtual channel through the packet core network, virtual channel connections must be constructed through each switch that the virtual channel traverses, connects, or through which the virtual channel extends. Permanent virtual channel connections (PVC) are made by the provisioning manager 18. Alternatively, virtual channel connections (SVC) are made by the signaling manager 16 to request a connection.

A request for either a virtual path connection or a virtual channel connection, whether it is a PVC or SVC, typically includes the quality of service (QoS) and other traffic parameters that characterize the connection. The parameter corresponding to the quality of service indicates whether the requestor of the connection requires any guarantees from the network to transport data over the connection at a certain rate, which is described by configuration parameters corresponding to the traffic. Parameters corresponding to traffic include features such as peak cell rate, average cell rate, cell delay variation and the network bandwidth that is required by the connection.

When a request is made to set up a virtual channel connection through a packet switch, software resident in the packet switch determines if the switch and physical interfaces through which the connection is to be made can support the requested bandwidth, which is generally called connection admission control ("CAC"). When a virtual channel connection is requested, it must be placed in a virtual path, so that the CAC software can determine if there is enough bandwidth remaining in the virtual path to support the new virtual channel connection. Because virtual channel connections can only be made over existing virtual paths, virtual paths provide a way to control the maximum bandwidth taken up by virtual channels in the network and, as a result, are helpful in managing the bandwidth in the packet network.

The CAC, for example, computes the equivalent bandwidth value for a circuit based upon the traffic parameters requested, acceptable cell delays, and the acceptable cell loss ratio. The calculation of the VC circuit's bandwidth indicates how tightly the VC circuits can be packed on the physical trunks while still guaranteeing the QoS levels. CAC algorithms may be customized to permit custom allocations of bandwidth to meet predefined QoS or traffic levels. The signaling manager 16 in cooperation with the provisioning manager 18 optimizes the packet network resources by avoiding congested paths and finding less congested paths thereby aiding in the fast delivery of information across the network. The signaling manager 16 establishes a network circuit path based on a virtual circuit's packet QoS requirements including bandwidth, acceptable end-to-end delay, cell delay variation, and the permitted cell loss ratio using a best route algorithm. Specifically, the signaling manager 16 incorporates policy enhancements that allow customer network operates to select specific physical trunks, create virtual private networks within the enterprise, and dedicate trunks to network control traffic.

Through concentrating the management of bandwidth and routing to the packet switching, CPE (including routers, hubs and multiplexers) can be configured to meet the very specific customer needs.

By extending packet bandwidth with broadband switches and routers into the local network environment, further CPE standardization may be achieved across the enterprise. A native packet-based LAN will support switched dial-up voice from a PC or work station as well as bursty data, duplex video and other traffic over the same physical wiring plant. In effect the requirement for separate local PBX switches or local channelized PBX switches and LAN routers are essentially eliminated. Native packet LAN and CPE have the added benefit of "grooming" traffic before it is handed to the packet edge switch for wide area transmission, significantly increasing capacity on the packet segments of the WAN. Every station on the network including properly equipped laptop computers may function as full duplex toll quality telephone sets. By using native packet switching, the "network is the switch," thus eliminating the need for diverse types of CPE to handle different information formats.

Although the invention has been described with reference to certain exemplary arrangements, it is to be understood that the forms of the invention shown and described are to be treated as preferred embodiments. Various changes, substitutions and modifications can be realized without departing from the spirit and scope of the invention as defined by the appended claims.

I claim:

1. In a telecommunications network of the type including a transport medium linking a plurality of nodes formed by one or more items of network equipment interconnected via virtual connections for transporting packetized data to and from network nodes in response to a signaling request, the improvement comprising:
    a provisioning manager coupled to the network for configuring the virtual connections and for monitoring the performance and operational status of the virtual connections and items of network equipment;
    a signaling manager coupled to the nodes via the transport medium for setting up, modifying and tearing down virtual connections between network nodes in response to the signaling request; and
    a traffic manager coupled to the signaling manager and to the provisioning manager for controlling the traffic loading of the network according to virtual connection attributes specified by the provisioning manager.

2. A telecommunications network as set forth in claim 1, wherein the signaling manager considers one or more factors to determine how large to make the corresponding bandwidth of each virtual connection, the one or more factors being selected from the group consisting of terms and conditions of a customer agreement covering the virtual connection, type of information that the virtual connection will transfer, the quality of service expected of the virtual connection, available bandwidth for the type of service requested, amount of requested bandwidth reserved per customer request for the quality of services offered, existing traffic load of the network, utilization of the network, and date and time of day that each virtual connection will occur.

3. A telecommunications network as set forth in claim 1, wherein the transport medium is selected from the group consisting of optical fiber, wire, coaxial cable and wireless.

4. A telecommunications network as set forth in claim 1, wherein the specific type of data includes data selected from the group consisting of voice, video, internet protocol, signaling data, network management data and customer payload data.

5. A telecommunications network as set forth in claim 1, wherein the provisioning manager includes:
    a billing/Call Detail Record (CDR) data base module for storing connection data, quantity of traffic, ingress/egress port utilization, time of day, quality of service and data type.

6. A telecommunications network as set forth in claim 1, wherein the provisioning manager includes a network model data base comprising a network physical and logical description, equipment specifications, physical connection specifications, node configuration specifications and virtual connection specifications.

7. A telecommunications network as set forth in claim 1, including:
    a plurality of external reference clocks coupled to the network, each external reference clock providing a reference clock signal as a timing input to one or more items of the network equipment for synchronizing the transfer of packetized data through each node; and
    a primary reference clock providing a primary reference clock signal, the primary reference clock signal being coupled as a common timing input to each of the external reference clocks for synchronizing the reference clock signals with the primary reference clock signal.

8. A telecommunications network as set forth in claim 7, wherein the external reference clocks each comprise a Stratum 1 clock having a free-run accuracy of $1 \times 10^{-11}$ second per month or better.

9. A telecommunications network as set forth in claim 7, wherein the primary reference clock comprises a Stratum 1 clock having a free-run accuracy of $1 \times 10^{-11}$ second per month or better.

10. A telecommunications network as set forth in claim 7, wherein the primary reference clock comprises the U.S. Global Positioning Satellite (GPS) broadcast frequency national time standard which is supplied to each external reference clock by wireless transmission.

11. A telecommunications network as set forth in claim 7, including a network source clock signal which is coupled to each item of network equipment for use as a timing input only in a default mode when the external reference clock signal is lost or otherwise not available.

12. In a telecommunications network of the type including a transport medium linking a plurality of nodes formed by one or more items of network equipment interconnected via virtual connections for transporting packetized data to and from network nodes, the improvement comprising:
    a plurality of external reference clocks coupled to the network, each external reference clock providing a reference clock signal as a timing input to one or more items of the network equipment for synchronizing the transfer of packetized data though the network equipment;
    a primary reference clock for providing a primary reference clock signal, the primary reference clock signal being coupled as a common timing input to each of the external reference clocks for synchronizing the reference clock signals with the primary reference clock signal; and
    wherein the external reference clocks each comprise an external Stratum 1 clock having a free-run accuracy of $1 \times 10^{-11}$ second per month or better.

13. A telecommunications network as set forth in claim 12, wherein the primary reference clock comprises a Stratum 1 clock having a free-run accuracy of $1 \times 10^{-11}$ second per month or better.

14. A telecommunications network as set forth in claim 12, wherein the primary reference clock comprises the U.S. Global Positioning Satellite (GPS) broadcast frequency national time standard which is supplied to each external reference clock by wireless transmission.

15. A telecommunications network as set forth in claim 12, including a network source clock signal which is coupled to each item of network equipment for use as a timing input only in a default mode when the external reference clock signal is lost or otherwise not available.

* * * * *